J. T. DAVIS.
BRIQUET PRESS.
APPLICATION FILED JUNE 15, 1909.

967,617.

Patented Aug. 16, 1910.
2 SHEETS—SHEET 2.

WITNESSES.
Arthur L. Slee.
a. Dixon.

INVENTOR.
John T. Davis,
by Spear & Seely,
ATTYS.

UNITED STATES PATENT OFFICE.

JOHN T. DAVIS, OF OAKLAND, CALIFORNIA, ASSIGNOR TO DAVIS BRIQUET COMPANY, OF OAKLAND, CALIFORNIA, A CORPORATION OF CALIFORNIA.

BRIQUET-PRESS.

967,617.   Specification of Letters Patent.   Patented Aug. 16, 1910.

Application filed June 15, 1909.   Serial No. 502,359.

*To all whom it may concern:*

Be it known that I, JOHN T. DAVIS, a citizen of the United States, residing at Oakland, in the county of Alameda and State of California, have invented new and useful Improvements in Briquet - Presses, of which the following is a specification.

My present invention is designed as an improvement in molding machines of the class in which such devices are used for forming briquets, or blocks, from a composition containing a pulverized fuel, as a fine coal, or peat, and an adhesive substance, or binder, preferably an oil product.

I aim by my invention to produce a machine for the purpose hereinafter described which will be simple of construction and of operation, and so compact and strong that it will stand the enormous strain to which it must be subjected to produce a briquet having the desired density.

I also aim to produce a direct feed of the material to the molds; a short and positive travel through the molding device, and a discharge so free that the machine can be run at a comparatively high rate of speed thereby securing a large output with a minimum expenditure of power and cost.

All of these objects, and other objects more particularly set forth in this specification and appended claims are secured by my invention, an embodiment of which is shown in the accompanying drawings.

It must be understood that the machine in the present construction herein described forms the briquets by continuous compression and that two briquets are formed simultaneously at the conclusion of the compression.

Figure 1:
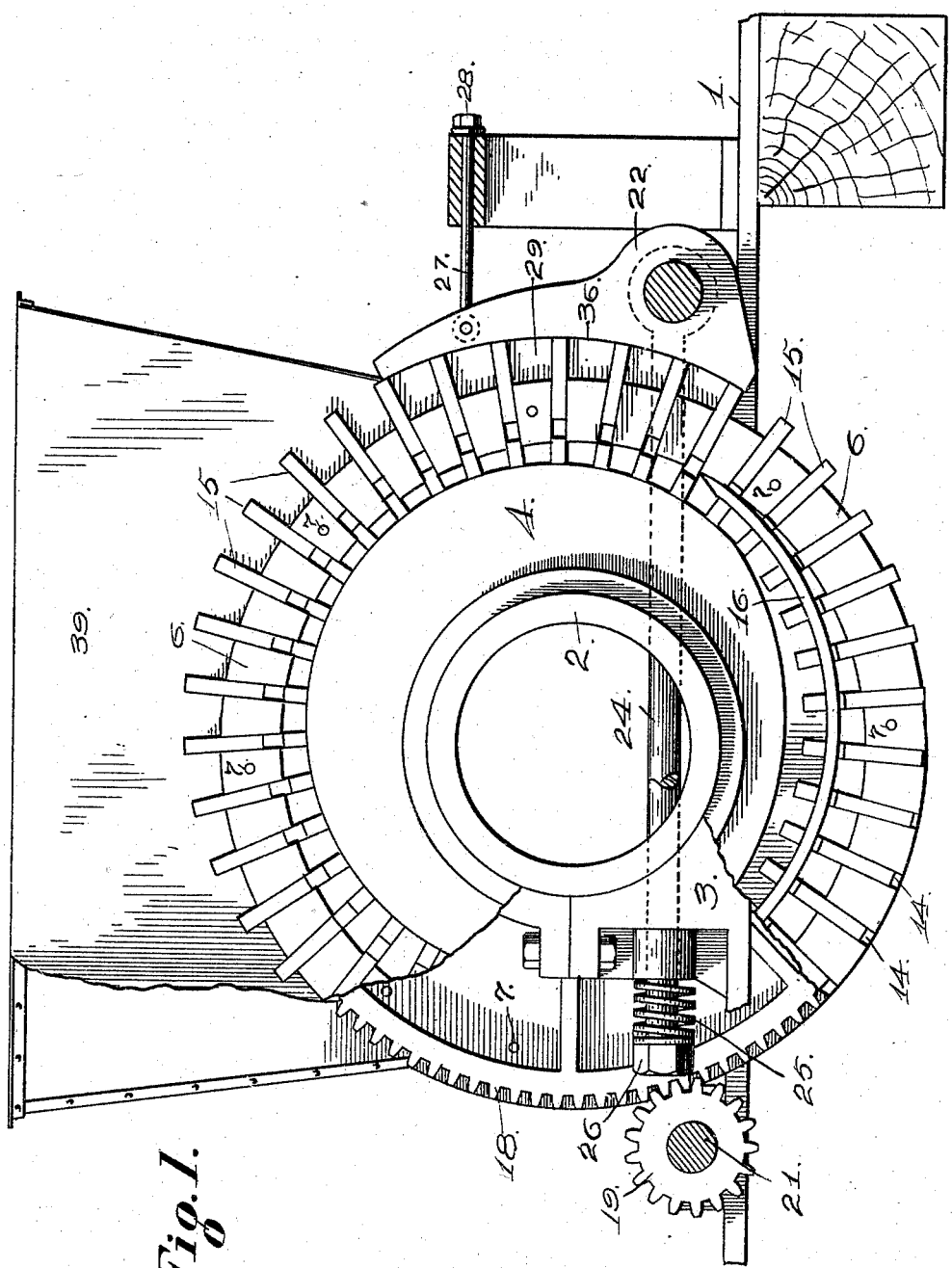
Figure 2:
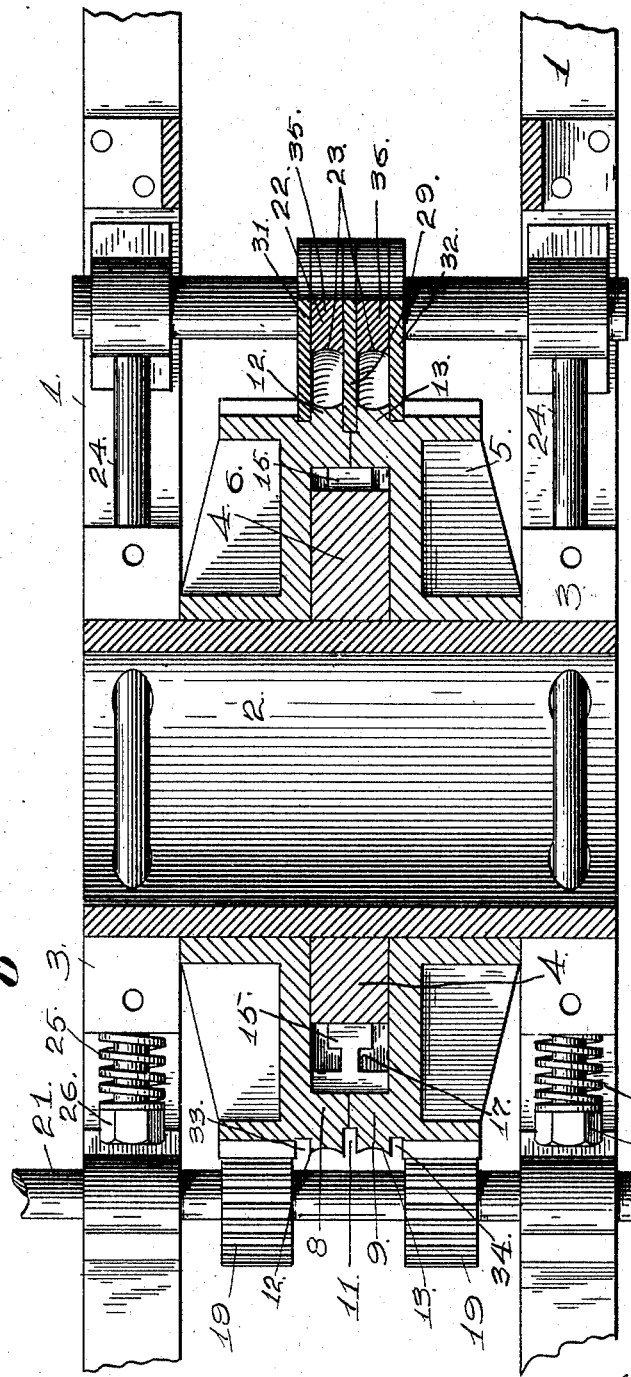
Figure 3:
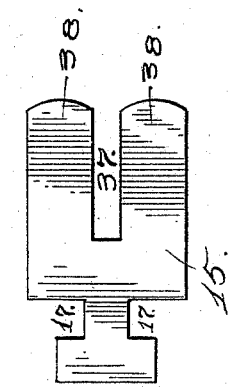

Reference is made to the drawings in which:

Figure 1 is a broken elevation, Fig. 2 is a horizontal section, and Fig. 3 is a detail of a vane, or flight.

Referring more particularly to the drawings the numeral 1 represents a suitable base on which is mounted the cylindrical shaft 2 by the supports 3. Rigidly mounted on this cylindrical shaft 2 is the cam 4, and rotatably mounted on the said cylindrical shaft are the annular pieces 5 and 6, which are rigidly secured together by any suitable means at points outside, or beyond, the periphery of the cam 4. In the drawing I have shown these two annular pieces 5 and 6 fastened together by means of bolts at the points 7. These annular pieces 5 and 6 are so constructed, and so mounted on the cylindrical shaft 2 that one of the said annular members will be on the one side of the rigidly mounted cam 4 and the other of the said annular members will be on the other, or opposite, side of the said cam piece. Inwardly extending from these two pieces 5 and 6, and integral therewith, are the annular flanges 8 and 9, which when in position, form a ring encircling the cam member 4. These flanges extend a short distance beyond, or outwardly from, the peripheries of the annular pieces, and they are so adapted that when they are in place an annular groove 11 is provided midway in the periphery formed by the said flanges. This forms two annular rings 12 and 13 in the peripheries of the flanges 8 and 9, and the peripheries of these two rings 12 and 13 are so formed with concave annular grooves, as shown in Fig. 2. The peripheries of these two concave grooved rings form one side of the molds for the briquets. Radially in these annular flanges 8 and 9 is a plurality of slots 14 in which are slidably operated a plurality of vanes, or flights, 15. A detail of these vanes, or flights, is shown in Fig. 3.

Suitably attached to, or integral with, the cam 4 are the cams 16, only one of which I have shown in Fig. 1. These cams are two in number and are identical in form, in position, and in operation, and they are adapted to operate in the notches 17 of the vanes, or flights, shown in Fig. 3. These cams extend but a short distance along near the under, or bottom, part of the machine and serve to draw inwardly the vanes, or flights, as they pass in that part of their progress.

On the peripheries of the annular pieces 5 and 6 are the annular toothed gearings 18 which are in mesh with the toothed gearings of the wheels 19 on the shaft 21 as a means of imparting revoluble motion to the annular members 5 and 6; their integral parts, and their plurality of slidable vanes, or flights.

Mounted on the base 1 is the mold member 22, presenting a concaved surface 23 to the periphery of the rings 12 and 13. This concaved surface 23 is closer to the periphery of the rings 12 and 13 at its lowermost part than at its uppermost part, the line of the peripheries of the two rings and the line of the curve of the concaved mold member 22 presenting a line of convergence. The lower part of the mold member 22 is yieldingly held in position by the rods 24 and the springs 25, and is adjustable by the nuts 26. The upper part of the mold member 22, as I have shown, is adjustably held in position by the rod 27 and the nut 28. This mold member 22 is provided with a projection, or flange, 29 along its whole length, which fits into and is slidable in the groove 11 of the annular pieces 5 and 6, and this projection, or flange, 29 is always in contact with the annular members 5 and 6 in the groove 11. Also on the mold member 22 are flanges, or projections, 31 and 32 along its whole length, and on each side of said member 22. These flanges 31 and 32 are provided to fit into and be slidable in the grooves 33 and 34 in the peripheries of the annular members 5 and 6. Between the flanges 29 and 31, and between the flanges 29 and 32 are mold pieces 35 and 36, which on their inner surfaces have concaved grooves, and these pieces with their concaved grooves are provided to be placed directly opposite the peripheries of the rings 12 and 13, which also have concaved grooves in their peripheries. These pieces 35 and 36 form a second side of the molds for the briquets, or blocks. I prefer in construction that this mold member 22 be built up of separate pieces, as described, as being more economical of construction and of replacement of wearing parts. It will be seen, however, that this member could be of one piece only.

The inside surfaces of the flanges 31 and 32, and the two surfaces of the flange 29 form other sides of the molds for the briquets, or blocks.

The vanes, or flights, 15 are provided, in their movement, to pass between and be in contact with the inner surfaces of the flanges 31 and 32 and the said vanes, or flights, are provided with a slot, or groove, 37 of such size and shape that it will allow the projection, or flange, 29 free passage through it but fit tightly enough so that there can be no leakage of material between its edges and the sides of the said projection, or flange, 29. The ends of the two fingers 38 of the vane, or flight, are convex to conform with the concaved grooves in the mold pieces 35 and 36.

The slots 14, with the vanes, or flights, 15 slidable in them, are so spaced apart that the opposing surfaces of the vanes, or flights, form the remaining sides of the molds for the briquets of the desired size.

Above, or on the upper part of the machine, is a hopper 39. This hopper is provided to fit closely against the surfaces of the pieces 5 and 6, and be of such width that the vanes, or flights, may extend upwardly into it. I prefer that the hopper be extended from the point in the machine where the vanes begin their outward movement to the point at the uppermost part of the mold member 22 where the vanes begin their inward movement.

The inner ends of the vanes, or flights, in their movement in the upper part of the machine, rest on the outward surface of the cam 4. In the movement in the lower part of the machine the vanes, or flights, are suspended by the cams 16. The cams 4 and 16 are so provided that the vanes, or flights, in their movement are given an outward motion when they enter the bottom of the hopper on the left side, as shown in Fig. 1, and they are given their farthest outward position when they reach the point at the other side of the hopper, or when opposite the uppermost point of the mold member 22. There their outward movement ends, or the convexed ends of their fingers, come into contact with the curved surfaces of the mold members. These curved surfaces present a line of convergence with the curve in which the vanes are now traveling and the surface of the cam 4 being so adapted, these curved surfaces of the member 22 force the vanes inwardly the desired distance as provided by the adjusted position of the mold member 22. At this point, or at the point when the vanes leave the innermost, or lower, part of the mold member 22 the notches 17 in the vanes engage with the cams 16 which draw the vanes farther inwardly until their outward ends are on a line, or nearly on a line, with the peripheries of the rings 12 and 13. These cams 16 extend to the point where the vanes, or flights, are given their outward movement by the cam 4.

In operation desired material is fed into the hopper and a rotary motion is imparted through the gearing described to the annular members 5 and 6. The vanes, or flights, in their travel through the material in the hopper, and their motion of increasingly extending their ends, or points of their fingers, into the material as they progress, will fill the spaces between them with the material. Then as the vanes, or flights, with the spaces between them filled with the material reach the point of contact with the mold member 22 compression of the material between the vanes, or flights, is begun. This compression is gradually increased as the vanes, or flights, travel along the surface of the last named mold member because of the line of convergence presented by the surface of the mold member 22 and the line of travel of the peripheries of the rings 12 and 13. This compression can be increased or decreased according to the adjustment given the mold member 22 by the provided adjusting rod and springs. After the compression is completed the vanes, or flights, are further drawn inwardly by means of the cams 16 so as to clear the formed briquets and allow them to fall clear of the machine at the bottom.

While I have shown and described a machine molding, or forming, two briquets by compression simultaneously, it will be readily seen that the same arrangement could be provided to mold, or form, one or more briquets simultaneously as may be best suited to meet the requirements, or conditions, presented.

I do not limit myself to the precise construction and arrangement herein described and shown in the drawings, as I desire to avail myself of such modification and equivalents as fall properly within the spirit of my invention.

Having thus described my invention, what I claim as new and desire to secure by Letters Patent is:

1. A briquet press comprising a stationary cam, a flanged rotatable member on each side of said cam, the flanges projecting inwardly and contacting with each other, said flanges having slots therein and mold surfaces on their peripheries, means for rotating said members, a plurality of radially movable members projecting through the slots and engaging with the cam, and an opposing mold member having mold surfaces thereon coöperating with the mold surfaces on the flanges.

2. A briquet press comprising two opposing mold members, one member comprising a stationary cam, a member surrounding the cam and having mold surfaces on its outer periphery, and radial slots therein, said slots and mold surfaces alining with the cam, radially movable members passing through the slots and engaging with the cam, a rack on said member, a pinion engaging therewith, means for rotating the pinion, said member having grooves therein on each side of each mold surface, and the other mold member having coacting mold surfaces and flanges thereon entering said grooves.

In testimony whereof I have affixed my signature in the presence of two witnesses this 29th day of March, 1909.

JOHN T. DAVIS.

Witnesses:
  A. DIXON,
  R. B. KYLE.